E. H. LEDERER.
GAME
APPLICATION FILED NOV. 13, 1920.
1,417,336. Patented May 23, 1922.
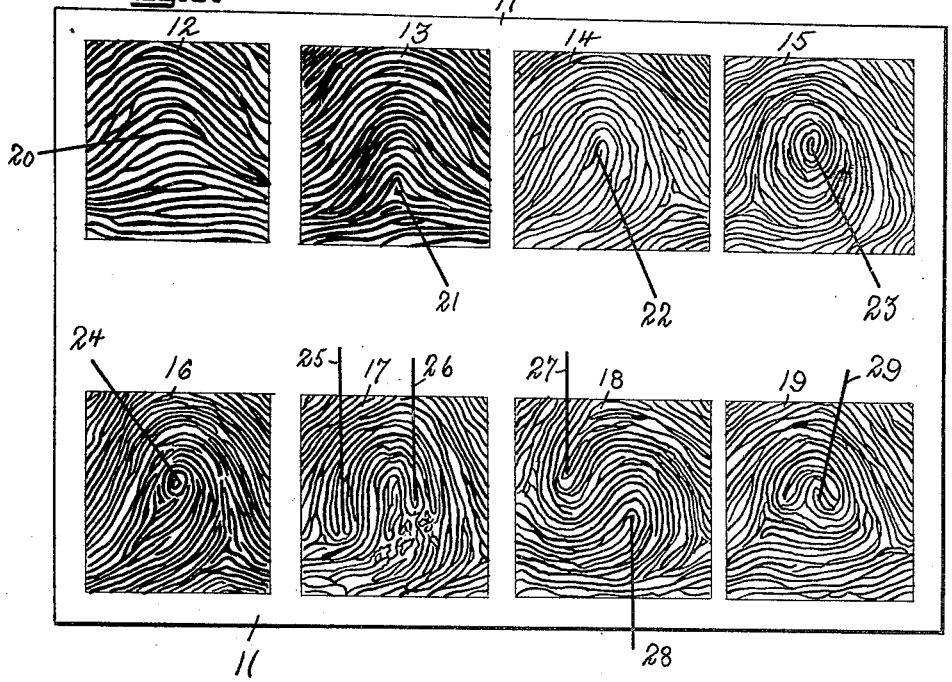
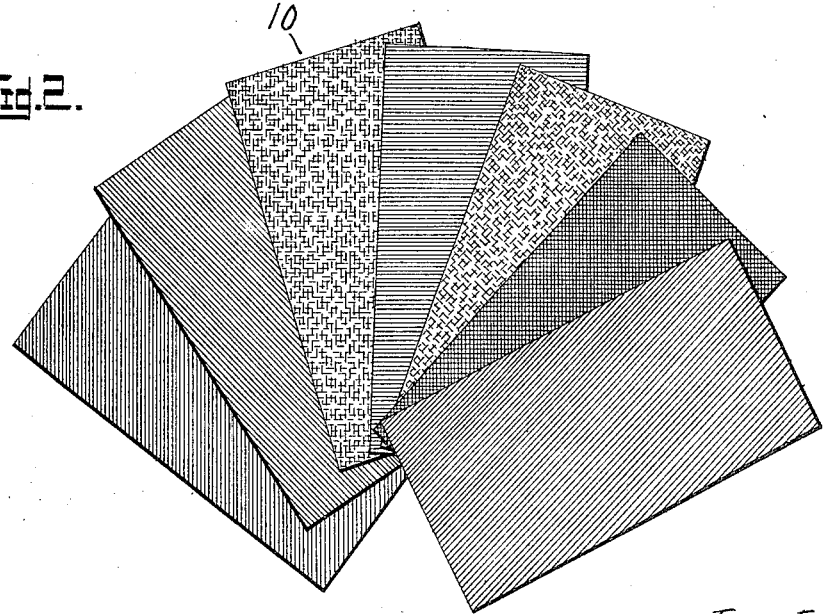
Inventor
E. H. Lederer
By Geo. S. Kimmel, atty
Witness

UNITED STATES PATENT OFFICE.

EUGENE H. LEDERER, OF STATE COLLEGE, PENNSYLVANIA.

GAME.

1,417,336.　　　　　Specification of Letters Patent.　　Patented May 23, 1922.

Application filed November 13, 1920. Serial No. 423,803.

*To all whom it may concern:*

Be it known that I, EUGENE H. LEDERER, a citizen of the United States, and a resident of State College, in the county of Center and State of Pennsylvania, have invented certain new and useful Improvements in a Game, of which the following is a specification.

This invention relates to a game apparatus, and has for one of its objects to provide an apparatus of this character in which the representation of finger prints is employed to instruct and amuse the players.

With these and other objects in view, the invention consists in certain novel features of construction as hereinafter shown and described and then specifically pointed out in the claims, and in the drawings illustrative of the preferred embodiment of the invention, Figure 1 represents a chart with the representation of a plurality of finger prints thereon.

Fig. 2 represents a plurality of cards of different colors to be employed in playing the game.

The game apparatus comprises a plurality of blank cards represented at 10 and preferably of different colors, and a chart indicated as a whole at 11 and having thereon a plurality of representations of finger prints of various types and indicated respectively at 12, 13, 14, 15, 16, 17, 18 and 19.

Disposed upon each finger print representation is one or more relatively heavy lead lines designated by the numerals 20, 21, 23, 24, 25, 26, 27, 28 and 29 and each terminating at its inner end at a distinctive part of the print.

The prints on the chart are representative of various types usually found on the fingers of individuals, for instance, the print 12 is the arch form showing ridges extending from one side to the other across the finger tip.

Print 13 is of the tented arch form, shaped as a tent, with the ridges rising higher in the center than the arches.

Print 14 is of the loop form, the curving of the ridges forming a loop.

Print 15 is the whorl form, shaped by the ridges forming a series of circles or spirals around a core.

Print 16 is of the central pocket loop form, the pocket being formed inside the loop.

Print 17 is of the lateral loop form, both loops emerging from one side of the finger tip.

Print 18 is the twin loop pattern showing two distinct loops which emerge from each side of the finger tip nearly like the lateral loop pattern shown on print 17.

Print 19 shows the accidental form, showing composite patterns which seem to form by accident, similar to a whorl.

The purpose of the chart is to teach the basic patterns of finger prints so that the players will have a knowledge of the various patterns, thus being able to select a distinctive mark or pattern from the imprint. The leader of the game studies the various illustrations of conventional finger prints and having the distinctive pattern in his mind the leader then makes an examination of the fingers of all the company in order to find the one whose finger tips resemble the ones impressed upon the paper (due to the perspiration of the fingers remaining on the paper) while he was absent from the company.

The game is played by one of a company pressing the fingers upon a card or other surface, to impart the print of the finger thereon which the leader amplifies in the usual manner by sprinkling fine powder, preferably black, over the print and then comparing it with the fingers of the company until he finds the one that compares with the imprint on the card or other papers which he has amplified. This person is the winner of the game.

Specific rules governing the conduct of the game may be adopted, for instance the following in general:

1. The leader retires, while one of the company presses the fingers of one hand upon a card to impart thereto an imprint of the fingers.

2. The leader prepares the imprint thus made for observation and compares it with the fingers of the group in order to find out the one who made the impression while the leader was absent.

3. The leader selects the person who made the imprint as the one who has won the game.

Many other rules and instructions may be issued as required, but these will not affect or abridge the operations above noted.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. A game apparatus comprising a body having thereon a plurality of representations of finger prints each containing a distinct characteristic feature, and a plurality of blank elements adapted to receive the finger prints of individual players to be compared with the characteristic finger prints on the body.

2. A game apparatus comprising a body having thereon a plurality of representations of finger prints each containing a distinct characteristic feature, an indicating line directed to the characteristic feature of each finger print representation, and a plurality of blank elements adapted to receive the finger prints of individual players to be compared with the characteristic finger prints on the body.

In testimony whereof, I affix my signature hereto.

EUGENE H. LEDERER.